US 9,014,151 B2

(12) United States Patent
Zou

(10) Patent No.: US 9,014,151 B2
(45) Date of Patent: Apr. 21, 2015

(54) METHOD AND APPARATUS FOR TRANSMITTING LOW-RATE TRAFFIC SIGNAL IN OPTICAL TRANSPORT NETWORK

(75) Inventor: Shimin Zou, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 601 days.

(21) Appl. No.: 11/525,332

(22) Filed: Sep. 22, 2006

(65) Prior Publication Data
US 2007/0076769 A1    Apr. 5, 2007

Related U.S. Application Data

(63) Continuation of application No. PCT/CN2005/001239, filed on Aug. 11, 2005.

(30) Foreign Application Priority Data

Aug. 11, 2004    (CN) .......................... 2004 1 0059163

(51) Int. Cl.
| H04B 7/216 | (2006.01) |
| H04J 3/16 | (2006.01) |
| H04J 14/02 | (2006.01) |

(52) U.S. Cl.
CPC ........... *H04J 3/1658* (2013.01); *H04J 14/0283* (2013.01); *H04J 14/0246* (2013.01);
(Continued)

(58) Field of Classification Search
CPC ..... H04W 72/04; H04W 76/02; H04W 16/10; H04W 16/14; H04J 14/02; H04J 14/0257; H04J 14/0282; H04J 14/0212; H04J 14/0256; H04J 14/0267; H04J 14/0275; H04J 14/0273; H04J 14/0246; H04J 14/0258; H04J 14/0279; H04J 14/0298; H04J 14/00; H04J 14/0247; H04J 2203/0089; H04Q 2011/0075
USPC ......... 370/335, 539, 337, 347, 203, 535, 542; 398/79, 43, 45, 58, 70; 356/73.1
See application file for complete search history.

(56) References Cited

U.S. PATENT DOCUMENTS

| 6,430,201 B1 * | 8/2002 | Azizoglu et al. .............. 370/535 |
| 6,725,176 B1 | 4/2004 | Long et al. |

(Continued)

FOREIGN PATENT DOCUMENTS

| CN | 1464691 A | 12/2003 |
| CN | 1499776 A | 5/2004 |

(Continued)

OTHER PUBLICATIONS

IEEE Std 802.3u—1995.*

(Continued)

*Primary Examiner* — Patrick Edouard
*Assistant Examiner* — Fred Casca
(74) *Attorney, Agent, or Firm* — Huawei Technologies Co., Ltd.

(57) ABSTRACT

A method and apparatus for low-rate traffic signal transmission on Optical Transport Networks (OTN). The method includes: defining a frame format of the low-rate traffic optical channel data unit (ODU) signal for bearing the low-rate traffic signal; mapping the low-rate traffic signal to the low-rate traffic optical channel payload unit (OPU) of the low-rate traffic ODU signal, generating overhead bytes and filling the bytes in an overhead section of the low-rate traffic ODU to obtain the low-rate traffic ODU signal; multiplexing low-rate traffic ODU signals to an ODUk signal of which the rate matches the transmission rate rank of the OTN where the signal is transmitted, and transmitting the signal via the OTN. Based on this method, the invention provides an apparatus for the low-rate traffic signal transmission in the OTN as well. With this invention, the low-rate traffic signal transmission in the OTN can be implemented conveniently.

13 Claims, 7 Drawing Sheets

(52) U.S. Cl.
CPC .......... *H04J14/025* (2013.01); *H04J 14/0201* (2013.01); *H04J 14/0227* (2013.01); *H04J 2203/0085* (2013.01)

(56) References Cited

U.S. PATENT DOCUMENTS

| | | | |
|---|---|---|---|
| 2002/0031146 | A1 | 3/2002 | Abbas et al. |
| 2003/0048813 | A1* | 3/2003 | Lahav et al. .................. 370/537 |
| 2003/0152079 | A1 | 8/2003 | Loeffler et al. |
| 2004/0114638 | A1* | 6/2004 | Matsuura et al. ............. 370/537 |
| 2005/0073955 | A1* | 4/2005 | MacLean et al. ............. 370/235 |
| 2005/0078685 | A1* | 4/2005 | MacLean et al. ........ 370/395.54 |
| 2005/0185705 | A1 | 8/2005 | Tanaka et al. |

FOREIGN PATENT DOCUMENTS

| | | |
|---|---|---|
| EP | 1 363 426 A1 | 11/2003 |
| EP | 1 657 839 A | 5/2006 |
| WO | 0237739 A2 | 5/2002 |
| WO | WO 2006/021157 A | 3/2006 |

OTHER PUBLICATIONS

ITU-T Recommendation G.709/Y.1331—2003.*
Mike Scholten et al: "Data Transport Applications Using GFP", IEEE Communications Magazine, IEEE Service Center, Pscataway, US, vol. 40, No. 5, May 2002, pp. 96-103, XP011092832.
"Series G: Transmission Systems and Media, Digital Systems and Networks, Digital Terminal Equipments, Generic Framing Procedure," ITUT G.704/ Y.1303, Dec. 2003, 58 pages.
"Series G: Transmission Systems and Media, Digital Systems and Networks, Digital Terminal Equipments—General, Interfaces for the Optical Transport Network (OTN)," ITUT G.709/Y.1331, Mar. 2003, 118 pages.
"Series G: Transmission Systems and Media, Digital Systems and Networks, Digital Terminal Equipments—Other Terminal Equipment, Characteristics of Optical Transport Network Hierarchy Equipment Functional Blocks," ITUT G.798, Jun. 2004, 306 pages.
"Series G: Transmission Systems and Media, Digital Systems and Networks, Digital Networks—General Aspects, Characteristics of Transport Equipment—Description Methodology and Generic Functionality," ITUT G.806, Feb. 2004, 146 pages.
"General Technical Requirement for Optical Wavelength—Division Multiplexing System (Temporary Regulations)," Posts and Telecommunications Regulations YDN 120-1999, Aug. 12, 1999, 68 pages.
"General Technical Requirement for Optical Wavelength—Division Multiplexing System (Temporary Regulations)," Partial English Translation of Posts and Telecommunications Regulations YDN 120-1999, Section 10.3, Aug. 12, 1999, 2 pages.
Foreign Communication From a Related Counterpart Application, Chinese Application 200410059163.3, Chinese Invalidation Reexamination dated Sep. 13, 2011, 62 pages.
Foreign Communication From a Related Counterpart Application, Chinese Application 200410059163.3, Partial English Translation of Chinese Invalidation Reexamination dated Sep. 13, 2011, 61 pages.
ITU-T G.872, "Architecture of optical transport networks", Series G: Transmission Systems and Media, Digital Systems and Networks, Nov. 2001, total 72 pages.
ITU-T G.872, "Architecture of optical transport networks Amendment 1", Series G: Transmission Systems and Media, Digital Systems and Networks, Dec. 2003, total 10 pages.
Jiyang Wang, 3Com Asia Ltd, "Gigabit Ethernet network to meet the challenges", with an English translation, China Academic Journal Electronic Publishing House, 1994-2012, total 8 pages.
Foreign Communication From a Related Counterpart Application, Chinese Application 200410059163.3, Chinese Examination Decision on Request for Invalidation (No. 18715) dated Jun. 13, 2012, 20 pages.
Foreign Communication From a Related Counterpart Application, Chinese Application 200410059163.3, Partial English Translation of Chinese Examination Decision on Request for Invalidation (No. 18715) dated Jun. 13, 2012, 7 pages.
Foreign Communication From a Related Counterpart Application, Chinese Application 200410059163.3, Supplemental Partial Chinese Examination Decision on Request for Invalidation (No. 18715) dated Jun. 13, 2012, 21 pages.
Foreign communication from a counterpart application, Chinese application 200410059163.3, First Office Action dated Nov. 10, 2006, 7 pages.
Foreign communication from a counterpart application, Chinese application 200410059163.3, Partial English Translation First Office Action dated Nov. 10, 2006, 5 pages.
Foreign communication from a counterpart application, Chinese application 200410059163.3, Second Office Action dated Mar. 30, 2007, 7 pages.
Foreign communication from a counterpart application, European application 07816984.4, Extended European Search Report, dated Nov. 27, 2009, 7 pages.
Foreign communication from a counterpart application, European application 09151024.8, Office action dated Dec. 2, 2009, 6 pages.
Liu, et al., "Analysis and Researches on Digital Wrapper," Journal of Guilin University of Electronic Technology, vol. 23, No. 5, Oct. 2003, pp. 26-30.
Foreign communication from a counterpart application, PCT application PCT/CN2005/001239, Written Opinion dated Nov. 24, 2005, 3 pages.
Liu, et al., "The Mapping and Multiplexing of Client Signals in OTN," Study on Optical Communications, vol. 3, Sum. No. 117, 2003. 4 pages.

* cited by examiner

METHOD AND APPARATUS FOR TRANSMITTING LOW-RATE TRAFFIC SIGNAL IN OPTICAL TRANSPORT NETWORK

CROSS-REFERENCE TO RELATED APPLICATIONS

This application is a continuation application of International Application No. PCT/CN2005/001239, filed Aug. 11, 2005, which claims priority in Chinese Application No. 2004-10059163.3, filed Aug. 11, 2004, both of which are entitled "Method and Apparatus for Transmitting Low-rate Traffic Signal in Optical Transport Network". The full disclosure of these applications are hereby incorporated by reference.

FIELD OF THE TECHNOLOGY

The present invention relates to optical communication techniques, and more particularly, to a method and apparatus for transmitting a low-rate traffic signal in an Optical Transport Network (OTN).

BACKGROUND OF THE INVENTION

Along with the fast development of OTN technology in recent years, International Telecommunications Union-Telecommunication Standardization Sector (ITU-T) has made a series of OTN recommendations, ITU-T G.709, G.798, G.87X, and commercial applications of OTN products are entering the industry, among which the recommendation of G.709 put forward in February 2001 is significant and has laid the technical foundation of optical networking. The key element of the G.709 is the technique of digital wrapper, which defines a special frame format so as to encapsulate a customer signal into a payload unit of a frame while providing overhead (OH) bytes at the head of the frame used for Operation Administration Maintenance and Provision (OAM&P) and providing forward error correction (FEC) bytes at the tail of the frame.

The standard frame format adopted by the digital wrapper is shown in FIG. 1. It is a frame format of 4 rows and 4080 columns, the 16 columns at the head of the frame are the overhead bytes, the 255 columns at the tail of the frame are FEC bytes, and the 3808 columns in the middle are payload.

Among the overhead bytes at the head of the frame, columns 1-8 of the 1st row is a Frame Alignment Signal (FAS), columns 9-14 are the overhead bytes of the kth type of Optical Channel Transport Unit-k (OTUk), wherein different values of k correspond to transmission modes with different rates, columns 1-14 of the 2nd to 4th row are the overhead bytes of Optical Channel Data Unit-k (ODUk), and columns 15 and 16 are the overhead bytes of Optical Channel Payload Unit-k (OPUk).

OTUk overhead bytes provide a monitoring function for the status of transmitted signal between the 3R (reamplification, reshaping, and retiming) regenerated nodes in the OTN, including 3 portions: the overhead bytes for Section Monitoring (SM), the overhead bytes for inter-terminal General Communication Channel (GCC) 0, and reservation (RES) bytes.

ODUk overhead bytes provide concatenation monitoring, point-to-point channel monitoring and provide customer signal adaptation via the OPUk. The ODUk provides plenty of overhead bytes (columns 1-14 of rows 2-4) to perform the above functions, including bytes of Path Monitoring (PM) overhead, Tandem Connection Monitoring (TCM) overhead, GCC 1 and GCC 2 overhead, Auto-Protection Switching/Protection Control Channel (APS/PCC) overhead, Fault Type Fault Location (FTFL) information, and Experiment (EXP) overhead.

The OPUK consists of payloads of mapped customer signals and related overhead, the overhead bytes include Payload Structure Identifier (PSI), Payload Type (PT), Reserved (RES) byte, and Mapping Specific Overhead etc.

At present, there are three methods for mapping the customer signal to the OTN, which are as follows:

(1) mapping signals with Constant Bit Rate (CBR) 2G5, CBR10G, and CBR40G to the OPUk: constant bit rate signals with CBR2G5—2488320 kbit/s±20 ppm, e.g. Synchronous Transfer Module (STM)—16; constant bit rate signals with CBR10G—9953280 kbit/s±20 ppm, e.g. STM—64; constant bit rate signals withCBR40G—39813120 kbit/s±20 ppm, e.g. STM—256. Two modes, an asynchronous mode and a bit synchronous mode, may be adopted in mapping. In the asynchronous mode, a local clock not associated with the customer signal is used with the positive/negative/zero code adjustification mechanism. In the bit synchronous mode, the clock extracted from the customer signal is used.

(2) mapping signals of Asynchronous Transfer Mode (ATM) to the OPUk: mapping the signals to the OPUk by multiplexing ATM Information Elements (IE) to constant bit streams matching the payload volume of the OPUk, the rate is adjusted by inserting idle IE or discarding IE during multiplexing operations. Information of ATM IE should be scrambled before mapping.

(3) mapping General Framing Procedure (GFP) frame signals to the OPUk: mapping GFP frames to continuous bit streams matching the OPUK by inserting idle frames during packaging, and scrambling is also conducted in this process. Other signals may be mapped to the OPUk as well, such as the customer signal, test signal, and common customer bit stream signal.

SUMMARY OF THE INVENTION

A method for transmitting a low-rate traffic signal in Optical Transport Network (OTN) such that the low-rate traffic signal could be mapped in the OTN with a high utility rate of bandwidth, a flexible dispatching mechanism could be provided for traffic signal of low-rate rank, and a point-to-point performance monitoring mechanism could be provided for the traffic signal of the low-rate rank. An apparatus for transmitting a low-rate traffic signal in the OTN is provided, so as to implement simply and conveniently the traffic uploading/downloading of low-rate traffic signal in the OTN.

A method for transmitting a low-rate traffic signal in the OTN, the low rate refers to a rate lower than 2.5 G bps, the method includes the steps of:

mapping the low-rate traffic signal to be transmitted to a low-rate traffic Optical channel Payload Unit (OPU) of a low-rate traffic Optical channel Data Unit (ODU) signal, the rate rank of the low-rate traffic ODU signal is the same as the rate rank of the low-rate traffic signal that the unit bears.

generating overhead bytes and filling the bytes in an overhead section of the low-rate traffic ODU, and obtaining the low-rate traffic ODU signal;

multiplexing at least one low-rate ODU signal to an ODUk signal with a rate rank of the OTN, and transmitting the ODUk signal via the OTN.

An apparatus for transmitting a low-rate traffic signal in an Optical Transport Network (OTN), the low rate refers to a rate less than 2.5 G bps, including: a mapping unit and an Optical Channel Data Unit-k (ODUk) terminal module;

the mapping unit is used for mapping and encapsulating a low-rate traffic signal to a low-rate traffic ODU signal, and/or de-mapping the ODUk signal from the ODUk terminal module into the low-rate traffic signal;

the ODUk terminal module is used for multiplexing low-rate traffic ODU signals sent from a mapping unit to obtain one ODUk signal matching a transmission rate rank of the OTN, and/or de-multiplexing input ODUk signal to obtain a path of the low-rate traffic ODUk signal and sending the signal to the corresponding mapping unit, respectively.

An apparatus for transmitting a low-rate traffic signal in an Optical Transport Network (OTN), applicable to network nodes in a reticular or ring network, comprising: a wavelength dividing/multiplexing unit, an Optical channel Transport Unit-k (OTUk) line unit, an Optical Channel Data Unit-k (ODUk) switching unit and a low-rate traffic signal mapping unit, wherein the wavelength dividing/multiplexing unit is used for receiving an optical signal in the OTN, performing the optic-layer signal processing, and obtaining an OTUk signal;

the OTUk line unit is used for conducting line correlation processing for the OTUk signal from the wavelength dividing/multiplexing unit and the low-rate traffic signal mapping unit to obtain the ODUk signal;

the ODUk switching unit is used for conducting the ODUk-rank cross dispatching for the ODUk signal from at least one of the OTUk line unit;

the low-rate traffic signal mapping unit is used for de-encapsulating and de-mapping the ODU signal from the ODU switching unit, converting the signal into the low-rate traffic signal, and outputting the signal to a local data network.

As can be seen from the above, in accordance with the method and apparatus for low-rate traffic signal transmission provided by the present invention, the GFP mapping is employed to map the low-rate (GE/FC) traffic signal into the ODUGE (low-rate traffic ODU) signal suitable for transmission in the OTN, an asynchronous or synchronous multiplexing approach is taken to the multiplex ODUGE signals to one-path ODUk signal, and ODUGE to ODUk mapping is carried out while an ODUGE crossing network is employed to implement the uploading/downloading of traffic of low-rate ranks. Therefore, the point-to-point performance management of data traffic of the GE/FC rank is implemented by setting the management overhead of the ODUGE frame format; the GE/FC transparent multiplexer as well as GE/FC transparent transmission in the OTN is implemented by asynchronous multiplexing of multiple GE/FC to ODUk, which greatly raises the utility rate of bandwidth; and flexible dispatching and traffic uploading/downloading of the GE-rank data traffic are implemented by means of the ODUGE low-order crossing network on OTN devices.

EMBODIMENTS OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention will hereinafter be described in detail with reference to accompanying drawings and specific embodiments.

In the current OTN recommendation, solutions to data traffic are all implemented by adapting data units to the OPUk through GFP, e.g., low-rate Gigabit Ethernet (GE) traffic or Fiber Connection (FC) traffic. Since the smallest switching granularity of the OTN is a 2.5 G rank (for different k, the rate is: 2.5 G when k=1, 10 G when k=2, and 40 G when k=3), if GE traffic is adapted to OPU1, and then dispatched by ODU1, the utility rate of bandwidth will not be high. If two GE signals are multiplexed by GFP adaptation and virtual concatenation to signal with 2.5 G and then to the OTN, the dispatching function of the ODUk in the OTN will have no effect on the GE signal. As many existing low-rate signals, such as the GE and FC signals, will exist for a long time as the customer signal in backbone networks and municipal area networks, especially in the backbone networks, it is an essential requirement to implement a transparent transmission of GE-rank traffic, a point-to-point management capability and a flexible traffic uploading/downloading capability at intermediate nodes.

In practical applications, if the GE or FC signals are adapted to a Synchronous Digital Hierarchy (SDH) virtual concatenation via the GFP, multiplexed to STM-16 signal and transmitted via the OTN, then it will increase the processing complexity of SDH layer, since that the traffic data should be converted to SDH format before being processing in intermediate nodes, and the traffic schedule should be implemented on the basis of virtual concatenation.

if the GE or FC signals are adapted directly to the OPUk via the GFP, there will be a waste of bandwidth resources because the OPUK with a lowest rate rank of 2.5 G is used to bear low-rate traffic signal with about 1 G and the smallest switching granularity has to be limited to the 2.5 G rank.

As a result, the above solution has the following disadvantages: if the approach of the GFP and SDH virtual concatenation is adopted to implement OTN mapping, the circuits will be complex, the cost is high, and it is impossible to implement point-to-point performance monitoring based on single class of low-rate traffic signal or to upload/download the traffic at the intermediate nodes directly, which makes the traffic dispatching inconvenient; if the OTN mapping is directly performed via the GFP, the utility rate of bandwidth is low, the switching granularity is too large, and the reliability has to be compromised.

Figure 1:
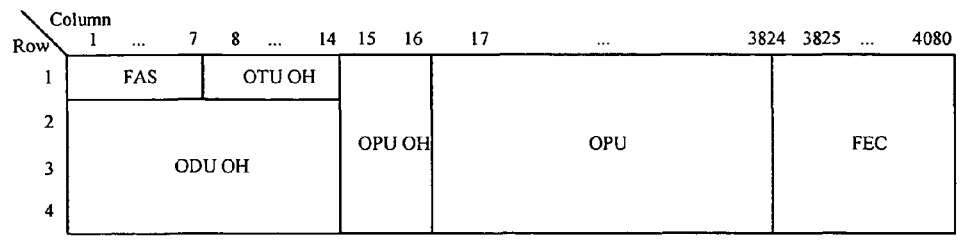
FIG. 1 is a schematic diagram illustrating a standard frame format of digital wrapper.
Figure 2:
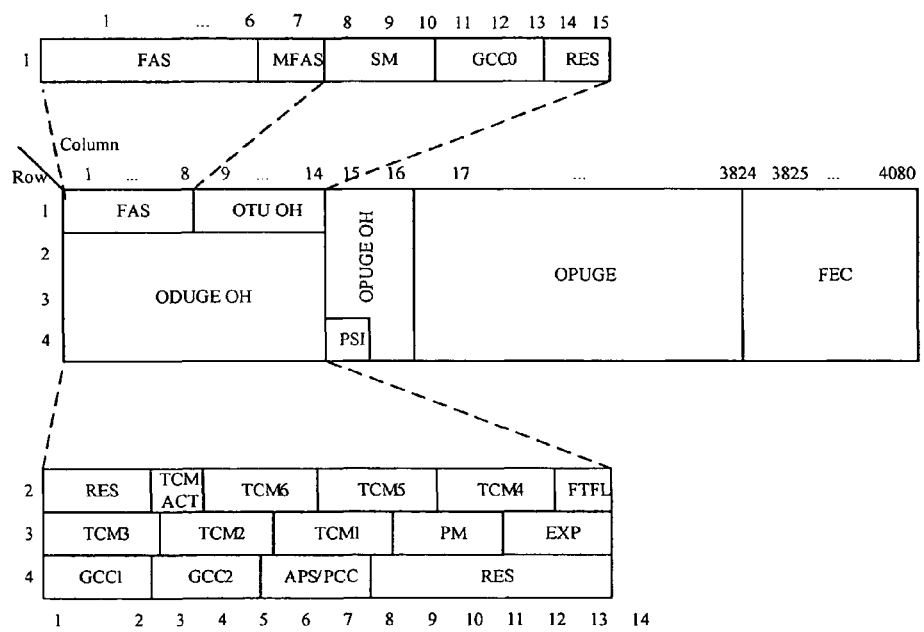
FIG. 2 is a schematic diagram illustrating the ODUGE frame format in accordance with an embodiment of the present invention.

In a first embodiment of the present invention, the frame format of an ODUk of low-rate traffic signal or Optical Channel Data Unit for Gigabit Ethernet (ODUGE) is defined for such a low-rate traffic signal as the GE or FC signal to be used as the bearer of the low-rate traffic signal, the low rate is a rate less than 2.5 G bps. The payload unit of the GE herein is OPUGE. The frame format of the ODUGE is shown in FIG. 2. In an ODUGE frame, the first 14 columns of rows 2 to 4 are the data management overhead section of the ODUGE (ODUGE OH); the 15th and 16th columns are the payload management overhead section (OPUGE OH); the 3808 columns from Column 17 to Column 3824 are the payload section (OPUGE), and from Column 3825 backward is the FEC section.

In this embodiment, it is preferred that the definition of each byte of the ODUGE OH is the same as that of the ODU OH defined by the digital wrapper in the prior art, thus there is an overhead for point-to-point management of GE-rank traffic to implement the point-to-point performance management of the GE-rank traffic. With reference to ITU-T Recommendation G.709, Line 1 of Columns 1-8 of the ODUGE frame contains a Frame Alignment Signal (FAS), Column 7 of Line 1 is a Multi-Frame Alignment Signal (MFAS), used for indicating the corresponding frame number to the overhead byte when multiple frames are carried; Line 1 of Columns 8-14 is the OTUk overhead section (OPUGE OH). The OPUGE OH includes a PSI byte, which is located in Row 4 of Column 15, and a PT byte, used for indicating the type of the payload carried, respectively.

In the preferred embodiments, the size of the ODUGE is 4×3824 bytes, and the bit rate is 1244160 Kbps±20 ppm, half of the payload section rate in the ITU-T Recommendation G.709. The size of the OPUGE, the payload section of the ODUGE, is 4×3810 bytes, the payload of the OPUGE is 4×3808 bytes with a corresponding bit rate of (3808/3824)×(1244160±20 ppm)=(238/239)×(1244160±20 ppm)=1238954.31 Kbps±20 ppm Adapt the GE or FC low-rate traffic to the payload section of the OPUGE through the GFP such that the Positive/Negative Justification bytes (PJ/NJ) of the OPUGE might not be used. The GE or FC traffic signals are in the rate of 1G rank after the 8B/10B decoding of the line, and in accordance with GFP-T mapping, the Transmission bandwidth of the GFP is:

1×(65/64)×(95×8×67+4+4+4)/(95×8×67)=1.015864346 Gbps

Even in consideration of ±100 ppm frequency deviation of the GE, the above mentioned payload section of the ODUGE/OPUGE provides sufficient volume for the rate of the GE or FC transmission after the GFP-T adaptation, including the transmission of information frames and idle frames, and for the rate of the GE or FC transmission after the GFP-F adaptation. If necessary, the management frames of the GFP may be transmitted as well.

It should be noted that the rate of 1 G rank said in this document refers to rates of about 1 G, e.g., the rates of GE signal, FC signal, and High Definition Television (HDTV) signal are about 1 G. Obviously, such signals after some special coding operations are still the signals with 1 G rank, wherein the special coding operation mentioned may be the FEC coding or other standard or custom coding.

The low rate mentioned in this document includes the rates of a FE rank as well. The transmission rate of an FE line is 125 Mbps±100 ppm, and the data after 4B/15B decoding are in the rate of 100 Mbps±100 ppm. As the idle frames are removed after decoding, the actual rate is less than 100 Mbps. If an ODUFE of the 100 Mbps rank is defined with a bit rate of (1244.16 Mbps±20 ppm)/10=124.416 Mbps±20 ppm, the rate of the payload section of the ODUFE is (238/239)×(124.416 Mbps±20 ppm) =123.8954M±20 ppm. This payload section provides a sufficient volume for transmitting FE payload as well as such information as the payload frames after the GFP-F adaptation, GFP idle frames and GFP management frames.

Figure 3:
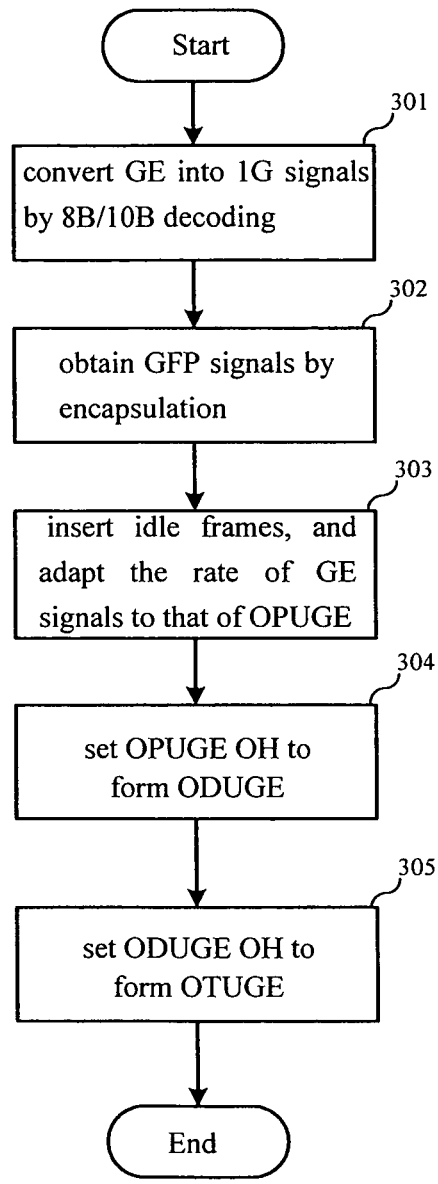
FIG. 3 is a flowchart of the method for mapping a low-rate traffic (GE/FC) signal to ODUGE in accordance with an embodiment of the present invention.

Take the GE signal as an example, the procedure of mapping GE to ODUGE is as shown in FIG. 3.

Step 301: convert the GE signal into data stream signal with 1 G-rank rate by the 8B/10B decoding procedure.

Step 302: encapsulate the data stream signal including payload information and control information into GFP signal.

The GFP encapsulation is conducted in line with the link-layer standard given by the ITU-T Recommendation G. 7041 while different methods of traffic data encapsulation, including the two methods of GFP-F and GFP-T, are employed to encapsulate different traffic data. The GFP-F method is applicable to packet data, which includes encapsulating the entire packet into the corresponding section of GFP payload information without any change of the encapsulated data while adding a payload detection field if needed. The GFP-T method is applicable to block data adopting the 64B/65B code, which includes extracting a single character from the received data block, and then mapping the character to a GFP frame of fixed length.

Step 303: make the overall rate of the GFP signal and the idle frames equal to the rate of the payload section of the OPUGE by inserting the idle frames, and form the payload of the OPUGE.

As the rate of the GFP signal is not consistent with the rate of the OPUGE payload section mentioned above, it is needed to fill in the idle frames to adjust the rate of the GFP signal. Since the OPUGE payload section is sufficiently large, it is possible to fill in the GFP management frames as required apart from the GFP idle frames needed to fill in.

Step 304: configure and insert the payload management overhead OPUGE OH, and form the ODUGE. The configuration of the OPUGE OH here is conducted in line with the ITU-T Recommendation G.709, the PSI and PT bytes are used for indicating that the type of this payload is GE.

Step 305: configure and insert the data management overhead ODUGE OH, and form the OTUGE. The configuration of the ODUGE OH here is in line with the ITU-T Recommendation G.709, used for implementing the point-to-point management of GE-rank traffic.

The above procedure is also applicable to the mapping of the traffic signal of the FC and FE ranks. The processing of the FC signal is the same as that of the GE, except that the rate of the data stream signal converted from the FC signal in Step 301 is 1.06×0.8 G. For the signal of the FE rank, the difference is that the decoding mode of the FE signal is 4B/5B, only GFP-F mapping is applicable to FE mapping, and the rate of the ODUFE is 1/10 of the ODUGE while other operations in the processing are the same.

After completing the mapping from the low-rate GE signal to the ODUGE, the encapsulated ODUGE signal is obtained. Thereafter, for the convenience of transmission, it is needed as well to multiplex frames of the ODUGE to one OPUk/

ODUk and form transferable OTUGE with two paths of the GE, which can make the best possible use of the transmission bandwidth, thereby improving the utility rate of the network resources.

Figure 4:
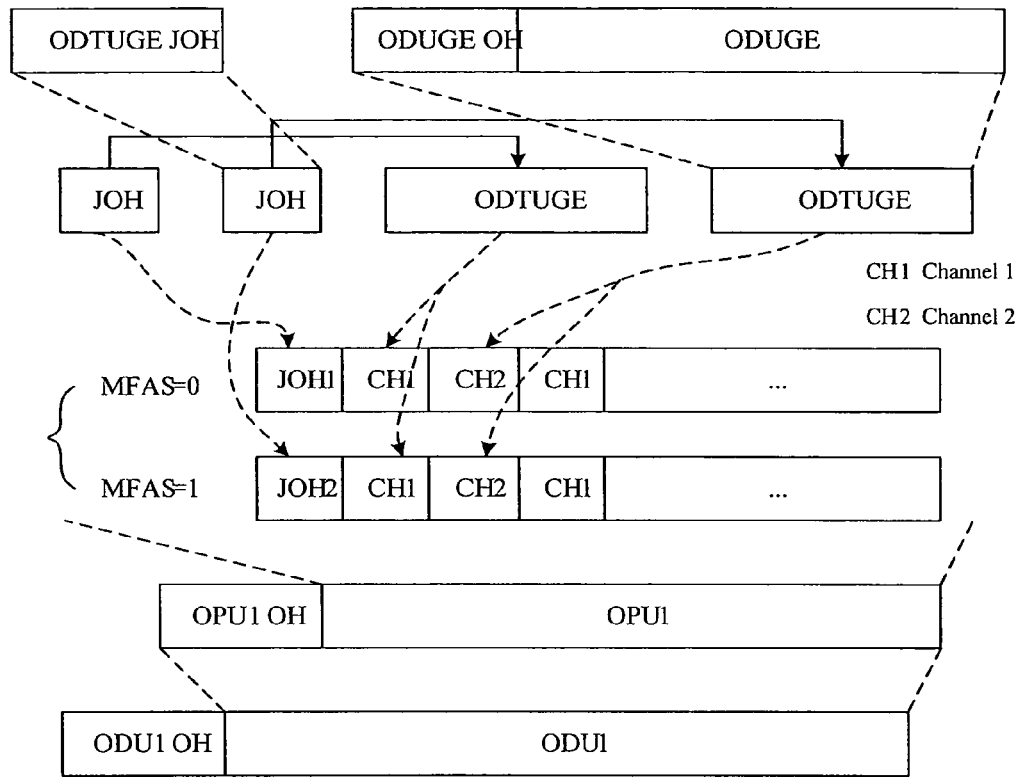
FIG. 4 is a schematic diagram illustrating the asynchronous multiplexing process from ODU2GE to OPU1/ODU1 in accordance with an embodiment of the present invention.

In a preferred embodiment of the present invention, two ODUGE (ODU2GE as in the embodiment of the present invention) are asynchronously multiplexed to one OPU1/ODU1, and the specific procedure of asynchronous multiplexing is as shown in FIG. 4. Take the ODUGE that includes the ODUGE OH as the payload, and add a Justification Overhead (JOH) ODUGE JOH to each ODUGE to obtain a first ODUGE, a first ODUGE JOH, a second ODUGE, and a second ODUGE JOH, i.e., to form the ODU2GE.

As shown in FIG. 4, multiplex ODU2GE asynchronously into OPU1 using the byte interleaving insert method while assigning JOH bytes according to time slot based on the multi-frame multiplexing mode. For a frame of which the MFAS is 0, set JOH as the first ODUGE JOH used for adjusting frequency difference of the first ODUGE; and for a frame of which the MFAS is 1, set JOH as the second ODUGE JOH used for adjusting the frequency difference of the second ODUGE. The follow-on payload section OPU1 is then divided into two channels with a certain length interval used for storing the first ODUGE and the second ODUGE, respectively.

As shown in FIG. 4, the process of asynchronously multiplexing the ODU2GE to OPU1/ODU1 specifically includes: first, adding the justification overhead of GE tributary unit group (ODTUGE) to the two ODUGE, respectively, to form ODTUGE signal; then dividing the payload section of OPU1 into two channels, for example, using the odd columns of the payload section as the first channel CH1 to bear the first ODUGE, and using the even columns thereof as the second channel CH2 to bear the second ODUGE, each channel including 3808/2=1904 columns with a volume of 4×1904 bytes; putting the data of the first ODTUGE into CH1 of OPU1, and putting the data of the second ODTUGE into CH2 of OPU1; Multiplexing the first ODTUGE JOH at OPU1 JOH where the MFAS is 0, and multiplexing the second ODTUGE JOH at OPU1 JOH where the MFAS is 1; setting PT, used for indicating that the payload of OPU1 is the ODTUGE; and finally, adding ODUL OH, OTU1 OH and the FAS bytes to OPU1 to obtain OTU1, thereby completing the process of adapting two ODUGE to ODU1.

Figure 5:
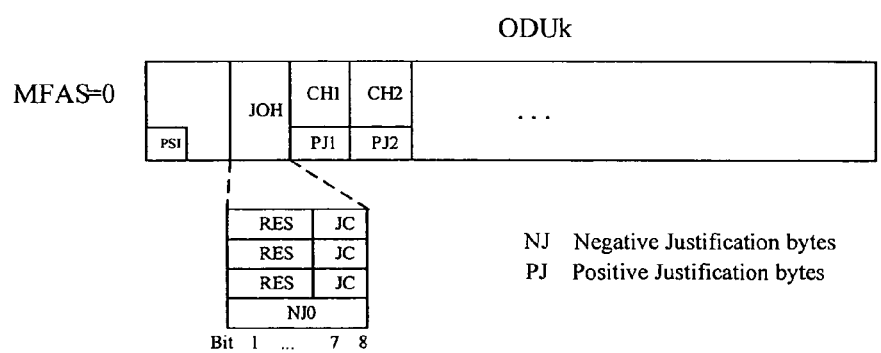
FIG. 5 is a schematic diagram illustrating the arrangement of a positive justification byte during asynchronous multiplexing in accordance with an embodiment of the present invention.

FIG. 5 shows the arrangement of a Positive Justification (PJ) byte in asynchronous multiplexing. When multiplexing the ODU2GE to OPU1/PDU1, put PJ1 and PJ2 in the 4th row of Column 1 and Column 2 of the payload section of OPU1 in a frame of which the MFAS is 0, PJ1 represents the positive justification byte for CH1 and PJ2 represents the justification byte for CH2. And in each byte of the JOH, only the last two bits are used.

In accordance with the embodiment of the present invention, 8 ODUGE (ODU8GE) may be asynchronously multiplexed to OPU2/ODU2.

The specific method here is similar to that for multiplexing the ODU2GE to OPU1/ODU1, i.e., multiplex the 8 ODUGE as well as the 8 corresponding ODUGE JOH to the payload and justification overhead of OPU2. As for the detail divide the time slot for the payload of OPU2 into 8 channels to arrange the data of the 8 ODUGE, respectively, while the 8 corresponding ODUGE JOH are put in the OPU2 JOH of which the MFAS are 0-7, respectively. Preferably, as the payload rate of OPU2, (238/237)×9953280 Kbps±20 ppm, is much larger than the total rate of 8 ODUGE, 8 ×1244160 Kbps±20 ppm, add one fixed inserting byte per 238 bytes when dividing a time slot of OPU2, i.e., set the N×238th byte as the fixed inserting byte, where N is 1-16.

The specific process of asynchronously multiplexing ODU8GE to OPU2/ODU2 includes: first, add the ODTUGE JOH to 8 ODUGE to form the ODTUGE signal; then divide the payload section of OPU2 into 8 channels, e.g., use Column 1 of the payload section as the first channel, Column 2 as the second channel, and the rest may be deducted by analogy, and insert one column of the idle byte every 238 columns; put the data of 8 ODTUGE into the 8 channels of OPU2, and multiplex the 8 ODTUGE JOH to the corresponding positions of OPU2 JOH in the order of the MFAS 0 to MFAS 7; set PT used for indicating the payload of OPU2 is ODTUGE; and finally, add ODU2 OH, OTU2 OH and the FAS bytes to OPU2 to obtain OTU2, thereby completing the process of adapting 8 ODUGE to ODU2.

Preferably, when multiplexing ODU8GE to OPU2/ODU2, put PJ1-PJ8 in the 4th row of Column 1 to Column 8 of the payload section of OPU2 in the frame of which the MFAS is 0, while only the last two bits of each byte of the JOH have been used.

Figure 6:
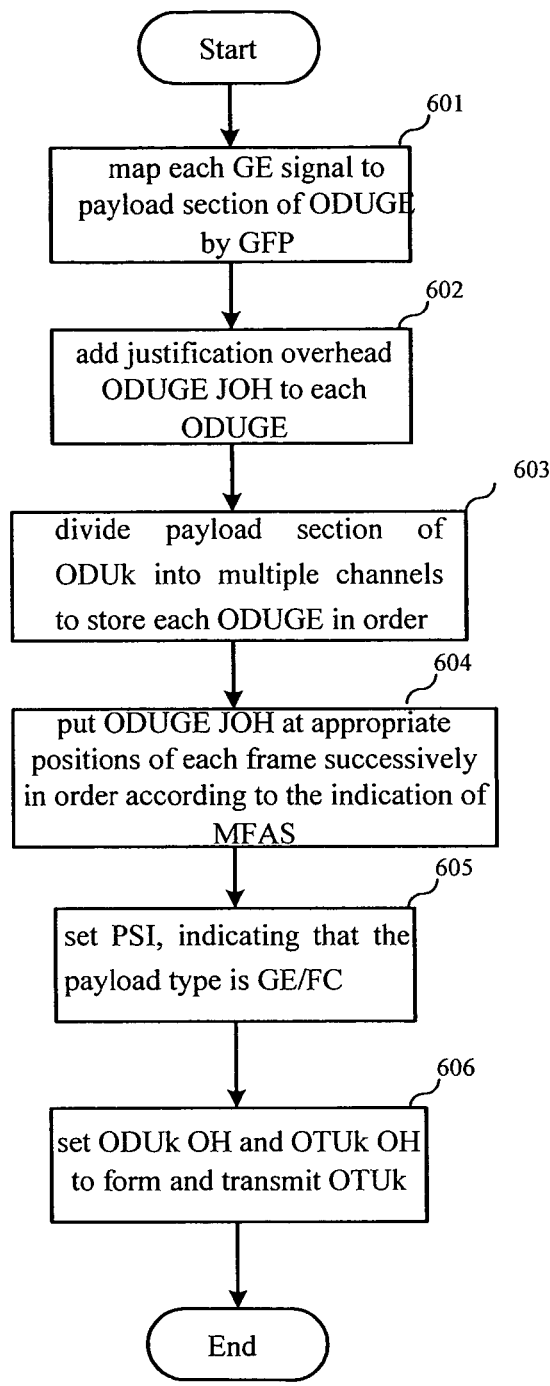
FIG. 6 is a flowchart of an asynchronous multiplexing method from ODUnGE to the OPUk/ODUk in accordance with an embodiment of the present invention.

Similarly, n ODUGEs may be asynchronously multiplexed to the OPUk/ODUk in accordance with the embodiment of the present invention as well, and the specific multiplexing process is shown in FIG. 6.

Step 601: adapt the low-rate traffic signal to the payload section of the ODUGE by the GFP to form n ODUGEs while generating ODUGE OH. Here, the method for mapping and generating overhead are the same as previously described for the ODU2GE and the ODU8GE.

Step 602: add the ODTUGE JOH to each ODUGE to form ODTUnGE signal; where the setting and arrangement of the justification overhead bytes are the same as previously described for the ODU2GE and the ODU8GE.

Step 603: divide the time slot of the payload section of the OPUk into n channels, and put the data of each ODTUGE (excluding ODTUGE JOH) into the appropriate channel.

Step 604: multiplex, according to the MFAS, the ODTUGE JOH of each ODTUGE to the position of the justification overhead of the OPUK in the corresponding frame. For example, frames of which the MFAS are 1-n correspond to Channels 1-n of each frame, respectively.

Step 605, set a PSI byte to indicate that the payload of OPU1 is the ODTUGE. A reserved byte RES in the PSI may be used and defined for this purpose.

Step 606: set the OPUK OH and the ODUk OH, adapt the OPUk to the ODUk and add the OTU OH and the FAS to form the OTU for transmission in the OTN.

Figure 7:
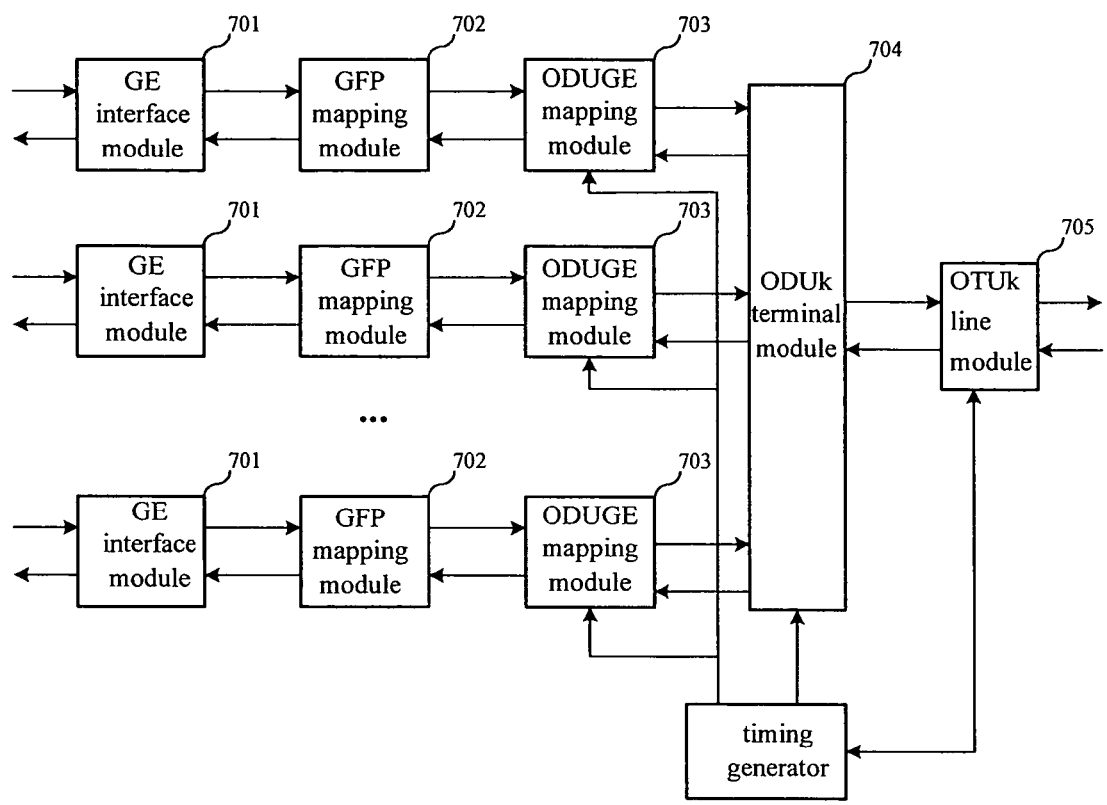
FIG. 7 is a schematic diagram illustrating the structure of a multiplexing subsystem from ODUnGE to the OPUk/ODUk in accordance with an embodiment of the present invention.

The apparatus for multiplexing low-rate ODUnGE to the high-rate OPUk/ODUk signal in the embodiment of the present invention based on the above described method is as shown in FIG. 7, including: n GE interface modules corresponding to each path of GE signal, respectively, 701, GFP mapping modules 702, ODUGE mapping modules 703, one ODUk terminal module 704 used for processing n paths of the ODUGE signals uniformly, one OTUk line module 705 used for signal adaptation processing, and one timing generator, where the GFP mapping module 702 and the ODUGE mapping module 703 jointly constitute the mapping unit.

When the low-rate traffic signal is transmitted, each path of low-rate GE/FC signal is first coded in the 8B/10B mode by the GE interface module 701 to obtain the signal with the rate of 1 G, and sent to the GFP mapping module 702; the GFP mapping module 702 conducts the GFP encapsulation for the 1 G signal sent from the GE interface module 701, where the encapsulating mode may be GFP-T or GFP-F; the GFP signal after the GFP encapsulation are sent to the ODUGE mapping module 703 by the GFP mapping module 702, written into the payload section of the ODUGE by the ODUGE mapping module 703, and adapted to match the rate by the method of inserting the GFP idle frames, thereafter the ODUGE mapping module 703 will generate the ODUGE OH and the FAS as well, and set the appropriate PT or PSI value of this low-rate traffic. Then each path of the low-rate traffic signal is processed to obtain paths of the ODUGE signal independent from each other but with the frequency difference within±20 ppm. Each path of the ODUGE will be sent to the ODUk terminal module 704 which asynchronously multiplexes the ODUGE signal of each path carrying the low-rate traffic signal to one path of ODUk signal. The flowchart of the asynchronous multiplexing method is as shown in FIG. 6, including steps of generating the justification overhead, dividing the channels, assigning and setting the justification bytes. Eventually, the ODUk signal carrying multiple paths of the GE/FC signals outputted from the ODUk terminal module 704 is processed by the OTUk line module 705, the processes of generating the OTUk OH, the scrambling, the FEC coding, a parallel/serial conversion and an electric/optic conversion are completed, and the signal after such processes are transmitted in the OTN.

When receiving the signal, first, the OTUk line module 705 completes such processes as an optical/electrical conversion, a frame alignment, a serial/parallel conversion, a de-scrambling and a FEC decoding to restore the ODUk signal; then the ODUk terminal module 704 implements the termination of the ODUk OH, and de-multiplexes the signal based on the PSI or PT indication to obtain multiple paths of the independent ODUGE signals, the de-multiplexing is the reversed operation of the asynchronous multiplexing previously described; each path of the ODUGE signal is input to the respective ODUGE mapping module 703, the frame alignment of the ODUGE is completed, and the GFP signal is obtained through the de-mapping operation; the GFP, signal is input to the GFP mapping module 702, de-encapsulation and 8B/10B decoding operations are carried out for the signal according to the GFP frame format, and the low-rate traffic signal of the GE/FC rank is restored.

In a preferred embodiment of the present invention, in order to make the best possible use of the bandwidth, n paths of GE/FC-rank traffic signal are multiplexed to an OTUk multiplexing subsystem, where n=2 if k=1; n=8 if k=2; and n=32 if k=3.

In an embodiment of the present invention, Transparent Multiplexer (TMUX) of the GE/FC traffic signal can be implemented by the above described mapping operation from the GE/FC to the ODUGE and multiplexing operation from multiple paths of the ODUGE to one path of ODUk, making it possible to transparently transmit multiple paths of the low-rate traffic signal in the OTN.

The method in the above embodiment is applicable to FE-rank low-rate data traffic as well, for example, 20 paths of the FE signal can be mapped to respective ODUFE through the GFP-F mapping, and then 20 paths of the ODUFE signal can be asynchronously multiplexed to one path of OPU1/ODU1.

Figure 8:
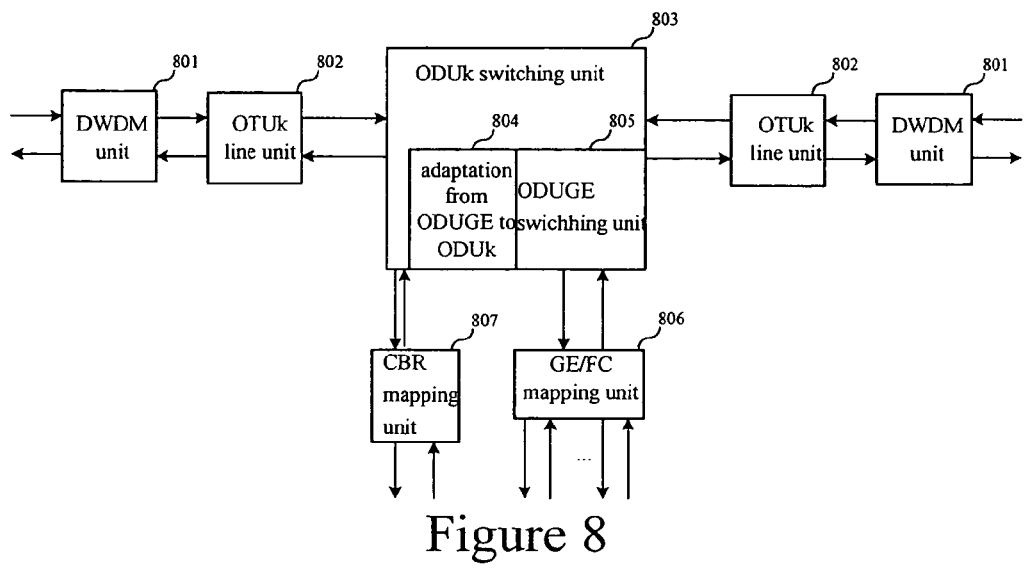
FIG. 8 is a schematic diagram illustrating the makeup and structure of an apparatus for low-rate traffic signal transmission in the OTN in accordance with an embodiment of the present invention.

FIG. 8 shows the makeup and structure of an apparatus for the low-rate traffic signal transmission in the OTN in accordance with an embodiment of the present invention. This apparatus constitutes a configuration of Optical Add/Drop Multiplexing (OADM) or Optical Cross-Connect (OXC) devices used for transmitting the low-rate traffic signal in the OTN. The apparatus includes, from optic layer to traffic layer, Dense Wavelength Division Multiplexing (DWDM) unit 801, OTUk line unit 802, ODUk switching unit 803, ODUGE-to-ODUk adaptation unit 804, ODUGE switching unit 805, and low-rate traffic signal mapping unit 806. The low-rate traffic signal mapping unit 806 is used for connecting the low-rate traffic (GE/FC) signal on a data network, implementing the GFP encapsulation/de-encapsulation and the ODUGE mapping/ de-mapping of the low-rate traffic signal as well as implementing the ODUGE overhead terminal function; the ODUGE switching unit 805 implements the cross dispatching of low-rate traffic signal ranks with the switching granularity of the ODUGE; the ODUGE-to-ODUk adaptation unit 804 implements the asynchronous multiplexing/de-multiplexing from the ODUGE to ODUk.

In the OTN apparatus as shown in FIG. 8, corresponding to the ODUnGE-to-OPUk/ODUk multiplexing subsystem shown in FIG. 7, this is the multiplexing subsystem used for conducting the multiplexing transmission of the low-rate traffic signal without network cross-dispatching, and implementing point-to-point OTN transmission.

In order to describe the working process of this apparatus in detail, an embodiment of the present invention is hereinafter presented to give a dynamic picture of the transmitting and receiving process thereof.

In the transmitting direction, first, the low-rate traffic signal mapping unit 806 adapts the GE/FC-rank data traffic to the ODUGE through the GFP adaptation; then the ODUGE switching unit 805 conducts small-granularity ODUGE cross-connect dispatching, and implements traffic uploading/downloading of the GE/FC rank; at the same time, the ODUGE-to-ODUk adaptation unit 804 multiplexes multiple paths of low-order ODUGE signal asynchronously, completing the multiplexing process to high-order OPUk/ODUk signal; thereafter, the ODUk switching unit 803 conducts the ODUk-rank traffic dispatching; finally, the OTUk line unit 802 completes the adaptation from ODUk to optical channels, and the DWDM unit 801 implements wavelength multiplexing and amplification of all the optical channels.

In the receiving direction, first, the DWDM unit 801 divides, based on the wavelength, the multiple signal into multiple single-wavelength signal; then the OTUk line unit 802 carries out the optic-electric conversion, the frame alignment, and termination of OTUk overhead, and separates the ODUk signal; the ODUk signal are dispatched by the ODUk cross-switching unit 803, and based on the payload identifier, the ODUk carrying the low-order data traffic is dispatched to the low-order cross network of the ODUGE; the ODUk signal are de-multiplexed to the multiple ODUGE signal by the ODUk-to-ODUGE adaptation unit 804, and are outputted to the cross network of the ODUGE; the ODUGE switching unit 805 dispatches the GE/FC-rank traffic that needs to be downloaded locally to the low-rate traffic signal mapping unit 806, and the low-rate traffic signal are restored after the de-mapping operation.

At the same time of dispatching and mapping the low-rate traffic signal, the traffic signal of other ranks are dispatched as usual, for example, CBR traffic signal are directly processed by the CBR traffic mapping unit 807 after being dispatched in the ODUk cross network.

Figure 9A:
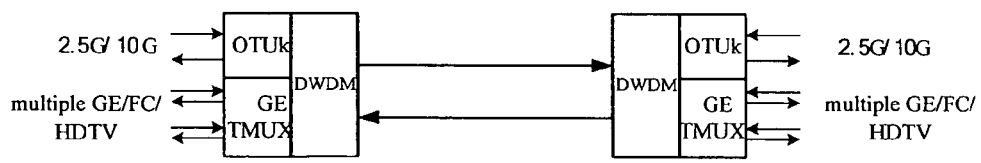
FIG. 9 are schematic diagrams illustrating the applications of the apparatus and method for low-rate traffic signal transmission in the OTN in various networks in accordance with an embodiment of the present invention.
Figure 9:
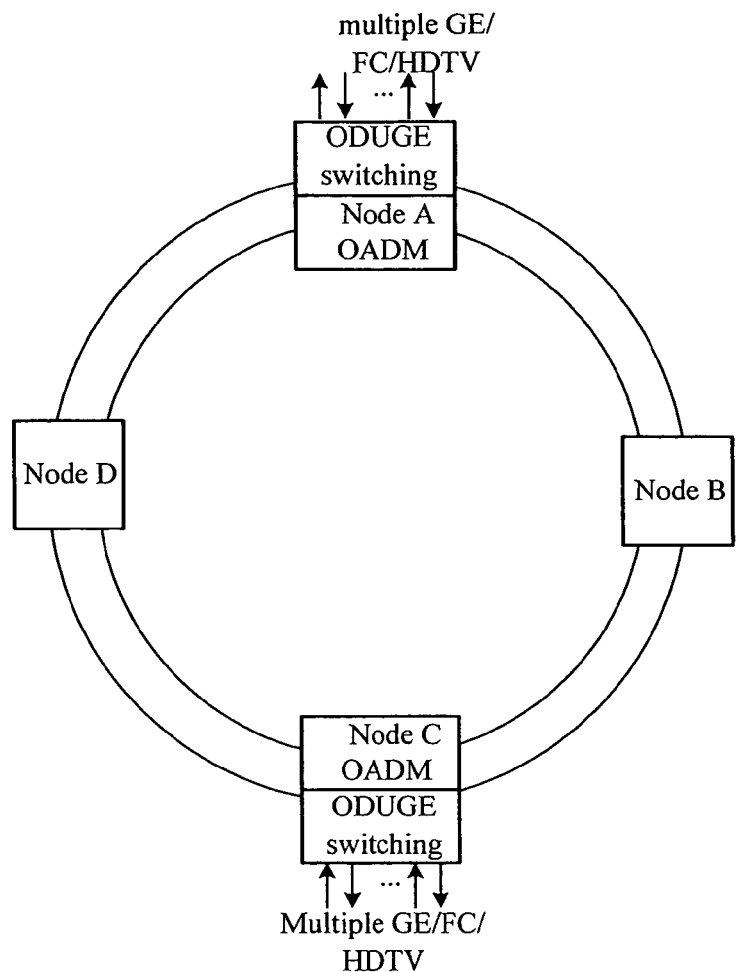
Figure 9C:
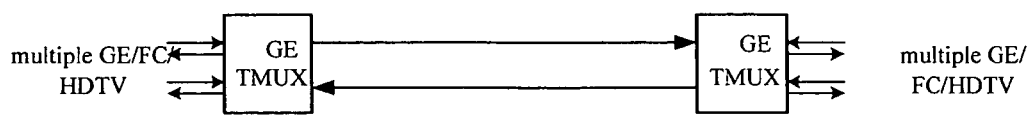

In another embodiment of the present invention, the above apparatus and method for low-rate traffic signal transmission in the OTN are employed for the transmission of the multiple GE, FC, and the HDTV signal on networks of three structures. FIG. 9 shows the applications of the apparatus and method for low-rate traffic signal transmission in the OTN in various networks in accordance with an embodiment of the present invention. As shown in FIG. 9(a), when transmitting multiple GE/FC/HDTV traffic from point to point, connect the two ends directly by means of the DWDM and the TMUX, and implement the bearer of the multiple GE/FC/HDTV traffic by the mapping; as shown in FIG. 9(*b*), in a reticular or ring OTN, each node is configured in the way as shown in FIG. 8 so as to implement the uploading/downloading of the GE/FC/HDTV-rank traffic; as shown in FIG. 9(*c*), the transmission of separate GE/FC/HDTV traffic can be implemented by the GE TMUX only.

It is understood by those skilled in the art that synchronous multiplexing may be employed as well for multiplexing the low-rate traffic ODU signal to ODUk signal although the asynchronous multiplexing method is employed in embodiments of the present invention. The above low-rate traffic signal may be that of any traffic of which the rate is less than the maximum OPUk transmission rate, e.g., Fast Ethernet (FE) traffic; the above 8B/10B coding mode may be other feasible coding modes; the above GFP encapsulating and mapping method may be that of other feasible adaptation protocols encapsulating formats, and the corresponding GFP mapping module may be replaced by the mapping modules of other adaptation protocols; the above associated values may be equivalently set as other values as required. For example, the values of the MFAS may be any group of values different from each other, and the position of the positive justification byte may be any fixed position within the channel that can achieve the objective of the invention without an impact on the essence and scope thereof.

Although preferred embodiments are disclosed herein, many variations are possible which remain within the concept, scope, and spirit of the invention, and these variations would become clear to those skilled in the art after perusal of this application.

What is claimed is:

1. A method for transmitting a low-rate traffic signal in an Optical Transport Network (OTN), comprising:
   mapping a single low-rate traffic signal, for transmission on the OTN, to a single low-rate traffic Optical channel Payload Unit (OPU), wherein the single low-rate traffic OPU includes a payload that has a size of 4×3,808 bytes and a bit rate of 1,238,954.31 Kbps±20 ppm, the single low-rate traffic signal is a Gigabit Ethernet (GE) signal or a Fiber Connection (FC) signal with a rate of 1.06 Gbit/s, and the mapping the single low-rate traffic signal to the single low-rate traffic OPU is performed using a General Framing Procedure (GFP) or other adaptation protocols;
   generating one or more overhead bytes for end to end managing the single low-rate traffic signal and filling the overhead bytes in an overhead section of a low-rate traffic Optical Channel Data Unit (ODU), wherein the low-rate traffic ODU contains the single low-rate traffic OPU and the overhead section of the low-rate traffic ODU, and the low-rate traffic ODU has a size of 4×3,824 bytes with a bit rate of 1,244,160 Kbps ±20 ppm;
   multiplexing at least the one low-rate traffic ODU to an ODUk with a rate rank of the OTN; and
   transmitting the ODUk via the OTN.

2. The method according to claim 1, wherein a frame of the low-rate traffic ODU comprises:
   a Frame Alignment Signal (FAS), an overhead section of the low-rate traffic ODU, and an overhead section of the single low-rate traffic OPU.

3. The method according to claim 2, wherein the step of mapping the single low-rate traffic signal to the single low-rate traffic OPU comprises:
   decoding the single low-rate traffic signal into a data stream signal;
   encapsulating the data stream signal into a GFP signal or signals of other adaptation protocols;
   by inserting idle frames, making the overall rate of the GFP signal or the signals of other adaptation protocols and the idle frames equal to the rate of the payload section of the single low-rate traffic OPU, and forming the single low-rate traffic OPU;
   wherein the step of filling the overhead bytes in an overhead section of the low-rate traffic ODU comprises:
   filling in the overhead section of the low-rate traffic ODU in accordance with a point-to-point management of the low-rate traffic signal rank, and obtaining the low-rate traffic ODU signal.

4. The method according to claim 1, wherein the step of multiplexing at least the one low-rate traffic ODU to an ODUk is implemented in an asynchronous multiplexing mode or synchronous multiplexing mode.

5. The method according to claim 1, wherein the step of multiplexing at least the one low-rate traffic ODU to an ODUk is implemented in the asynchronous multiplexing mode, comprising the steps of:
   dividing the OPUk of the ODUk into multiple channels with the same number according to time slot, adding a Justification Overhead to each low-rate traffic ODU to form each low-rate traffic ODTU signal, and putting each low-rate traffic ODTU signal into each appropriate channel;
   indicating different low-rate traffic ODU signals with different indicating values of the multi-frame alignment, and putting the justification overhead (JOH) of the low-rate traffic ODTU corresponding to each low-rate traffic ODU at the position of the JOH of the OPUk;
   setting a Payload Structure Identifier (PSI) to indicate the type of the low-rate traffic ODU signal in the OPUk;
   filling in the overhead section of the OPUk and the overhead sections of the ODUk of every rank, adapting the OPUk to the ODUk, and adding the overhead section of OTUk and the FAS to form an OTUk signal.

6. The method according to claim 1, wherein the multiplexing operation is selected from one of:
   multiplexing two low-rate traffic ODU with a rate rank of 1 G bps to one ODUk with a rate rank of 2.5 G bps; or
   multiplexing 8 low-rate traffic ODU with a rate rank of 1 G bps to one ODUk with a rate rank of 10 G bps; or
   multiplexing 32 low-rate traffic ODU with a rate rank of 1 G bps to one ODUk with a rate rank of 40 G bps.

7. An apparatus for transmitting a low-rate traffic signal in an Optical Transport Network (OTN), comprising:
   at least one mapping unit and an Optical Channel Data Unit-k (ODUk) terminal module; wherein the mapping unit is adapted to:
   map a single low-rate traffic signal to be transmitted to a single low-rate traffic Optical channel Payload Unit (OPU), wherein the one low-rate traffic OPU includes a payload that has a size of 4×3,808 bytes and a bit rate of 1,238,954.31 Kbps±20 ppm;
   and generate overhead bytes and fill the overhead bytes in an overhead section of a low-rate traffic Optical Channel Data Unit ODU, wherein the low-rate traffic ODU contains the single low-rate traffic OPU and the overhead section of the low-rate traffic ODU, and the low-rate traffic ODU has 4×3,824 bytes with a bit rate of 1,244,160 Kbps ±20 ppm, and wherein the overhead bytes are used for end to end management of the one low-rate traffic signal, or de-map the ODUk from the ODUk terminal module into the one low-rate traffic signal; and wherein the ODUk terminal module is adapted to: multiplex low-rate traffic ODU sent from a mapping unit to obtain one ODUk, or de-multiplex input ODUk to obtain at least one path of the low-rate traffic ODU and send the signal to the corresponding mapping unit, respectively;

wherein the single low-rate traffic signal is a Gigabit Ethernet (GE) signal or a Fiber Connection (FC) signal with a rate of 1.06 Gbit/s, and the mapping the single low-rate traffic signal to the single low-rate traffic OPU is performed using a General Framing Procedure (GFP) or other adaptation protocols.

8. The apparatus according to claim 7, wherein each mapping unit comprises:

a mapping module of General Framing Procedure (GFP) or other adaptation protocols and a low-rate traffic ODU mapping module;

wherein the mapping module of the GFP or other adaptation protocols is adapted to encapsulate the GFP or other adaptation protocols for the input low-rate traffic signal to obtain signal of the GFP or other adaptation protocols, and/or de-encapsulate the GFP signal or signals of other adaptation protocols coming from the low-rate traffic ODU mapping module to obtain the one low-rate traffic signal; and wherein the low-rate traffic ODU mapping module is adapted to map the signal of the GFP from the mapping module of the GFP or map the signals of other adaptation protocols from the mapping module of other adaptation protocols to the low-rate traffic ODU to obtain the low-rate traffic ODU signals, and/or de-map the low-rate traffic ODUk signal from the ODUk terminal module to obtain the signal of the GFP or signals of other adaptation protocols.

9. The apparatus according to claim 8, further comprising a low-rate traffic signal interface module, adapted to decode the input low-rate traffic signal before converting the signal into data stream signal and outputting the data stream signal to the mapping unit, or code the signal from the mapping unit to obtain the one low-rate traffic signal.

10. The apparatus according to claim 7, further comprising a low-rate traffic signal interface module, adapted to decode the input low-rate traffic signal before converting the signal into a data stream signal and outputting the data stream signal to the mapping unit, or code the signal from the mapping unit to obtain the one low-rate traffic signal.

11. The apparatus according to claim 7, further comprising Optical channel Transmission Unit (OTUk) line modules, adapted to conduct line correlation processing for the ODUk of various ranks from the ODUk terminal module, and output optical signals for transmission in the OTN, or conduct the line correlation processing for the optical signals in the OTN to obtain the ODUk signals of various ranks.

12. An apparatus for transmitting a low-rate traffic signal in an Optical Transport Network (OTN), applicable to network nodes in a reticular or ring network, comprising: a wavelength dividing/multiplexing unit, an Optical channel Transport Unit-k (OTUk) line unit, an Optical Channel Data Unit-k (ODUk) switching unit, an low-rate traffic ODU to ODUk adaption unit, and a low-rate traffic signal mapping unit, wherein the wavelength dividing/multiplexing unit is configured to receive an optical signal in the OTN, perform the optic-layer signal processing and obtain an OTUk signal;

wherein the OTUk line unit is configured to conduct line correlation processing for the OTUk signal from the wavelength dividing/multiplexing unit;

wherein the ODUk switching unit is configured to conduct the ODUk-rank cross dispatching for the ODUk signal from at least one of the OTUk line unit;

wherein the low-rate traffic ODU to ODUk adaptation unit is configured to implement asynchronous multiplexing and de-multiplexing between a low-rate traffic ODU signal originated from the low-rate traffic signal mapping unit and an ODUk signal from ODUk switching unit;

wherein the low-rate traffic signal mapping unit is further adapted to map a single low-rate traffic signal to be transmitted to a single low-rate traffic Optical channel Payload Unit (OPU), wherein the single low-rate traffic OPU includes a payload that has a size of 4×3,808 bytes and a bit rate of 1,238,954.31 Kbps±20 ppm ; and generate overhead bytes and fill the overhead bytes in an overhead section of a low-rate traffic ODU, wherein the low-rate traffic ODU contains the single low-rate traffic OPU and the overhead section of the low-rate traffic ODU, and the low-rate traffic ODU has 4×3,824 bytes with a bit rate of 1,244,160 Kbps±20 ppm; wherein the overhead bytes are used for end to end management of the low-rate traffic signal; and transmit the signal to the ODU switching unit;

wherein the OTUk line unit is further adapted to conduct line correlation processing for the ODUk signal from the ODUk switching unit to obtain the OTUk signal;

wherein the wavelength dividing/multiplexing unit is further adapted to make the optic-layer processing of the OTUk signal from the OTUk line unit to obtain the optical signal for transmission in the OTN.

13. The apparatus according to claim 12, further comprising a low-rate traffic signal ODU switching unit;

wherein the low-rate traffic signal ODU switching unit is adapted to cross-dispatch the low-rate traffic ODU with a bit rate of 1,244,160 Kbps±20 ppm wherein the ODUk switching unit is further adapted to conduct the ODUk-rank cross-dispatching for the ODUk signal from the low-rate traffic ODU to ODUk adaptation unit.

* * * * *

UNITED STATES PATENT AND TRADEMARK OFFICE
CERTIFICATE OF CORRECTION

Page 1 of 1

PATENT NO. : 9,014,151 B2
APPLICATION NO. : 11/525332
DATED : April 21, 2015
INVENTOR(S) : Shimin Zou It is certified that error appears in the above-identified patent and that said Letters Patent is hereby corrected as shown below:

On the title page, item (75) Inventor: delete "Guangdong (CN)" and insert --Shenzhen (CN)--.

Signed and Sealed this
Twenty-ninth Day of September, 2015

Michelle K. Lee
*Director of the United States Patent and Trademark Office*